(12) United States Patent
Scotese (10) Patent No.: US 6,985,795 B2
(45) Date of Patent: Jan. 10, 2006

(54) MATERIAL HANDLER WITH CENTER OF GRAVITY MONITORING SYSTEM

(75) Inventor: Michael J. Scotese, Carlisle, PA (US)

(73) Assignee: Schlage Lock Company, Indianapolis, IN (US)

( * ) Notice: Subject to any disclaimer, the term of this patent is extended or adjusted under 35 U.S.C. 154(b) by 213 days.

(21) Appl. No.: 09/961,063

(22) Filed: Sep. 21, 2001

(65) Prior Publication Data

US 2003/0060923 A1 Mar. 27, 2003

(51) Int. Cl.
*G06F 7/00* (2006.01)

(52) U.S. Cl. .................. 700/217; 700/218; 212/278; 212/279

(58) Field of Classification Search ............. 212/278, 212/279; 700/217, 218
See application file for complete search history.

(56) References Cited

U.S. PATENT DOCUMENTS

| | | | |
|---|---|---|---|
| 3,815,116 A | * 6/1974 | Fink | 340/666 |
| 4,057,792 A | * 11/1977 | Pietzsch et al. | 340/685 |
| 4,078,224 A | 3/1978 | Mize | |
| 4,086,576 A | 4/1978 | Jebb et al. | |
| 4,511,974 A | * 4/1985 | Nakane et al. | 701/124 |
| 4,573,742 A | * 3/1986 | Tegtmeier | 298/11 |
| 4,636,137 A | * 1/1987 | Lemelson | 414/730 |
| 4,705,295 A | * 11/1987 | Fought | 280/754 |
| 4,711,614 A | * 12/1987 | Erker et al. | 414/641 |
| 4,839,835 A | * 6/1989 | Hagenbuch | 702/174 |
| 4,942,529 A | * 7/1990 | Avitan et al. | 701/50 |
| 4,952,908 A | * 8/1990 | Sanner | 340/429 |
| 5,032,821 A | 7/1991 | Domanico et al. | |
| 5,067,572 A | * 11/1991 | Kyrtsos et al. | 177/139 |
| 5,146,706 A | * 9/1992 | Hilliard | 43/42.13 |
| 5,390,104 A | * 2/1995 | Fulton | 700/65 |
| 5,528,499 A | * 6/1996 | Hagenbuch | 701/50 |
| 5,631,832 A | * 5/1997 | Hagenbuch | 701/35 |
| 5,647,477 A | * 7/1997 | Morishita | 198/619 |
| 5,684,456 A | 11/1997 | Walter | |
| 5,825,284 A | 10/1998 | Dunwoody et al. | |
| 5,826,846 A | * 10/1998 | Buccieri et al. | 248/280.11 |
| 6,002,974 A | 12/1999 | Schiffmann | |
| 6,032,094 A | 2/2000 | Yanagi et al. | |
| 6,055,472 A | 4/2000 | Breunig et al. | |
| 6,082,742 A | * 7/2000 | Ishikawa | 280/5.508 |
| 6,144,295 A | * 11/2000 | Adams et al. | 340/442 |
| 6,145,415 A | * 11/2000 | Liu | 81/143 |
| 6,157,889 A | * 12/2000 | Baker | 701/124 |
| 6,241,020 B1 | * 6/2001 | Newman | 166/250.01 |
| 6,397,133 B1 | * 5/2002 | van der Pol et al. | 701/37 |
| 6,437,701 B1 | * 8/2002 | Muller | 340/679 |
| 6,561,546 B2 | * 5/2003 | Puszkiewicz et al. | 280/755 |
| 6,611,746 B1 | * 8/2003 | Nagai | 701/50 |
| 6,648,289 B2 | * 11/2003 | Toennesland et al. | 248/276.1 |
| 6,785,597 B1 | * 8/2004 | Farber et al. | 701/50 |

FOREIGN PATENT DOCUMENTS

GB   2324871 A   * 11/1998

* cited by examiner

*Primary Examiner*—Donald P. Walsh
*Assistant Examiner*—Michael E. Butler
(74) *Attorney, Agent, or Firm*—Michael Best & Friedrich LLP (57) ABSTRACT

A material handler that includes a frame, first and second front wheels, first and second rear wheels, and a control system. The front and rear wheels define a generally horizontal plane. The control system determines the center of gravity of the material handler and displays the location of the center of gravity of the material handler within the plane.

10 Claims, 5 Drawing Sheets

MATERIAL HANDLER WITH CENTER OF GRAVITY MONITORING SYSTEM

FIELD OF THE INVENTION

The invention relates to material handlers, and more particularly to material handlers with telescoping booms.

BACKGROUND OF THE INVENTION

Material handlers include a frame, a front axle, a rear axle, and front and rear wheels. Typically, the front axle is either fixed relative to the frame or pivotal about a horizontal axis that extends centrally along the length of the frame. The rear axle is pivotally coupled to the rear end of the frame. The rear axle is allowed to freely pivot about the horizontal axis and thereby tilt in response to changes in ground contours in order to provide the vehicle with increased comfort and stability. However, under various loading conditions, the freely pivoting rear axle may cause the material handler to become less stable. As a result, some material handlers include rear axle stabilizer systems that have one or more lockable cylinders connected to a vehicle hydraulic system and positioned between the frame and the rear axle. The cylinders are generally open to allow the cylinder and the rear axle to move freely. The cylinders are also lockable to rigidly fix the position of the rear axle relative to the frame.

Material handlers also include telescoping booms which are used to lift and transport loads. A typical telescoping boom includes a rearward or lower end that is coupled to a back end of the frame and a forward or upper end that extends toward a front end of the frame. The telescoping boom is extendable between a retracted position and an extended position and pivotable between a lowered position and a raised position. The telescoping boom is typically equipped with a fork that is insertable underneath a pallet in order to raise a load that is stacked on top of the pallet and move it to another position. The load is moved relative to the material handler and therefore it is possible to locate the load into a position that will cause the material handler to become unbalanced and, in extreme circumstances, cause the material handler to tip over.

In order to alert the operator to a potential unbalanced condition, some material handlers include a tip over warning system to alert a vehicle operator of the amount of longitudinal weight shift from rear to front of the vehicle. One or more strain gauges are located on the rear axle to sense the vehicle weight supported by the axle. The signals from the strain gauges are used to determine the remaining weight on the rear axle of the vehicle. The system activates a warning lamp or buzzer that indicates to the operator that a longitudinal tip over may soon occur.

Other material handlers, especially cranes, include systems that measure the carried load and calculate the center of gravity of the machine and load by measuring the machine geometry. Typically, these systems measure the angle, length, and orientation of the boom. For the method to work properly, the machine must be level and stationary. These systems activate warning alarms to warn the operator that the vehicle is potentially unstable.

SUMMARY OF THE INVENTION

The center of gravity monitoring system of the present invention improves productivity by identifying when a material handler is operating at a stable loading condition and by accurately predicting when the material handler is operating close to an unstable loading condition based on the relative loads applied to each of the front wheels and rear wheels. The center of gravity monitoring system also includes a control system that enhances productivity by not allowing machine functions that would cause the material handler to be positioned in a more unstable loading condition. The center of gravity monitoring system also increases the overall efficiency of an operator and the material handler by eliminating the need for the operator to flip through manual load charts to determine the stability of a loading condition and by providing the operator with a display that is based on automatically sensed parameters such as the loading applied to each wheel.

The present invention is directed to a material handler that includes a frame, first and second front wheels, first and second rear wheels, and a control system. The front and rear wheels define a generally horizontal plane. The control system determines the center of gravity of the material handler and displays the location of the center of gravity of the material handler within a virtual plane that is representative of the plane defined by the wheels.

The present invention is also directed to a method of monitoring the center of gravity of a material handler. The method includes sensing the center of gravity and displaying the location of the center of gravity of the material handler within virtual plane that is representative of a plane that is defined by front and rear wheels.

Other features and advantages of the invention will become apparent to those skilled in the art upon review of the following detailed description, claims, and drawings.

Before one embodiment of the invention is explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein is for the purpose of description and should not be regarded as limiting. The use of "including" and "comprising" and variations thereof herein is meant to encompass the items listed thereafter and equivalents thereof as well as additional items. The use of "consisting of" and variations thereof herein is meant to encompass only the items listed thereafter. The use of letters to identify elements of a method or process is simply for identification and is not meant to indicate that the elements should be performed in a particular order.

DETAILED DESCRIPTION

Figure 1:
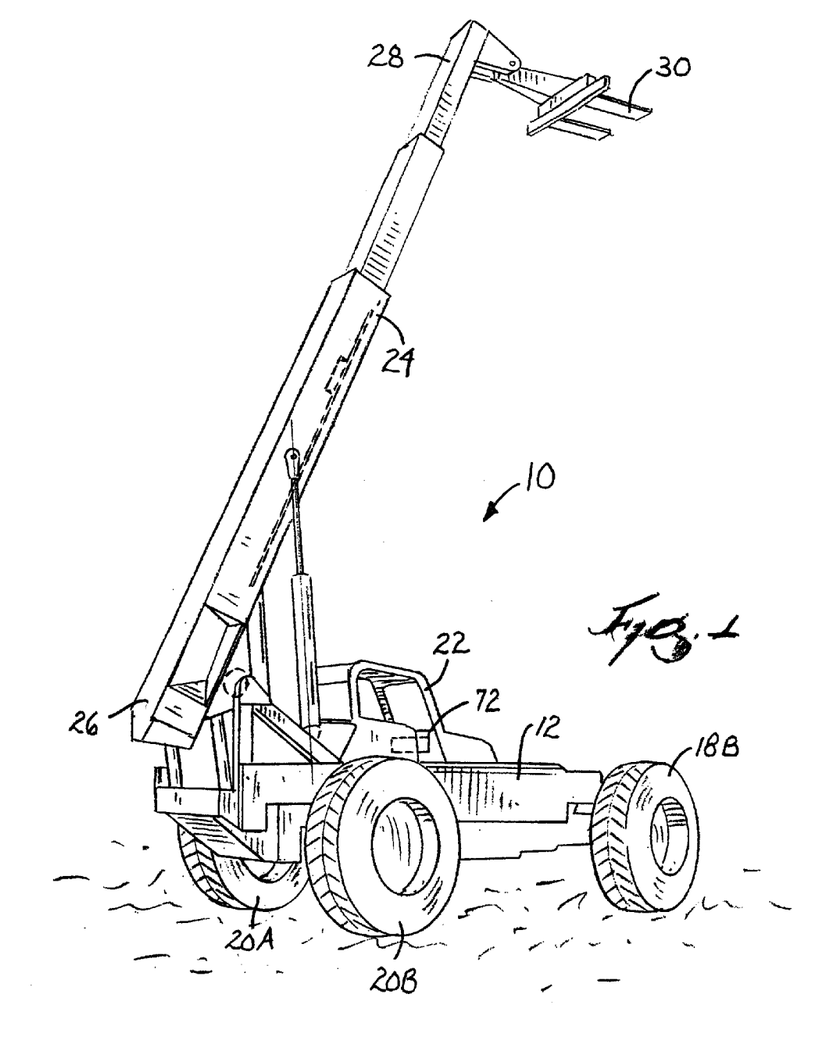
FIG. 1 is a perspective view of a material handler embodying the present invention.

FIG. 1 illustrates a material handler 10 of the present invention. The material handler 10 includes a frame 12, a front axle 14, a rear axle 16, front wheels 18A, 18B, and rear wheels 20A, 20B. The frame 12 is supported above the ground for movement by the axles 14, 16 and the wheels 18A, 18B, 20A, 20B. The material handler 10 includes an engine (not shown) that is operably coupled to the axles 14, 16 to drive the wheels 18A, 18B, 20A, 20B. The material handler 10 includes an operator's station 22 that is centrally located above the frame 12.

The material handler 10 includes a telescoping boom 24 that is used to lift and transport loads. The telescoping boom 24 includes a rearward or lower end 26 that is coupled to the rear end of the frame 12 and a forward or upper end 28 that extends toward the front end of the frame 12. The telescoping boom 24 is extendable between a retracted position and an extended position and pivotable between a lowered position and a raised position. The telescoping boom 24 is extended and pivoted by respective hydraulic cylinders (not shown) that are controlled by the operator from the operator's station 22. The telescoping boom 24 is equipped with a fork 30 that is insertable underneath a load in order to raise and move the load to another position. Other attachments, such as a truss boom or bucket, are interchangeable with the fork 30.

Figure 2:
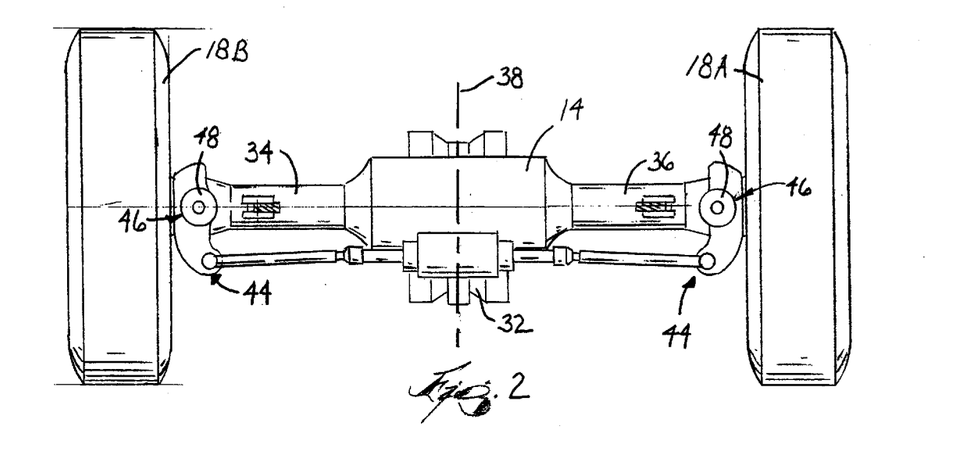
FIG. 2 is a top view illustrating a front axle of the material handler shown in FIG. 1.
Figure 3:
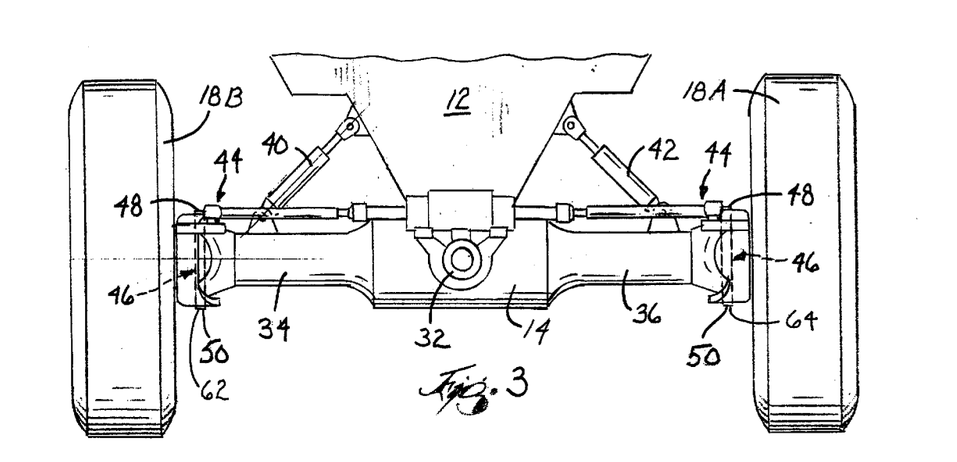
FIG. 3 is a front view illustrating the front axle shown in FIG. 2.

FIGS. 2 and 3 illustrate the front axle 14 and the front wheels 18A, 18B. The front axle 14 is pivotally connected to the frame 12 at a pivot union 32 that divides the front axle 14 into first and second portions 34, 36. The front axle 14 is either fixed relative to the frame 12 or pivotal about a horizontal axis 38 with a controlled leveling system. The horizontal axis 38 extends centrally along the length of the frame 12. The controlled leveling system allows an operator to controllably level the frame 12 relative to the front axle 14. The controlled leveling system includes a first hydraulic cylinder 40 that is connected between the frame 12 and the first portion 34 of the front axle 14 and a second hydraulic cylinder 42 that is connected between the frame 12 and the second portion 36 of the front axle 14. The controlled leveling system is also operable with only a single hydraulic cylinder that is connected between the frame 12 and the axle 14. The operator controls the extension and retraction of the cylinders 40, 42 to tilt the axle and thereby level the frame 12. The hydraulic cylinders 40, 42 do not permit any free movement and only extend or retract in response to operator commands.

The first front wheel 18A is rotatably connected to the first portion 34 of the front axle 14 and the second front wheel 18B is rotatably connected to the second portion 36 of the front axle 14 such that the front wheels 18A, 18B can be driven by the engine to move the frame 12 of the material handler 10. The portions 34, 36 of the front axle 14 include steering assemblies 44 that allow the front wheels 18A, 18B to pivot relative to the front axle 14 about respective king pins 46. This configuration allows the operator to steer the front wheels 18A, 18B in order to direct the motion of the material handler 10. The king pins 46 each include an upper king pin 48 that is inserted from the top of the steering assembly 44 and a lower king pin 48 that is inserted from the bottom of the steering assembly 44 and connected to the upper king pin 48.

Figure 4:
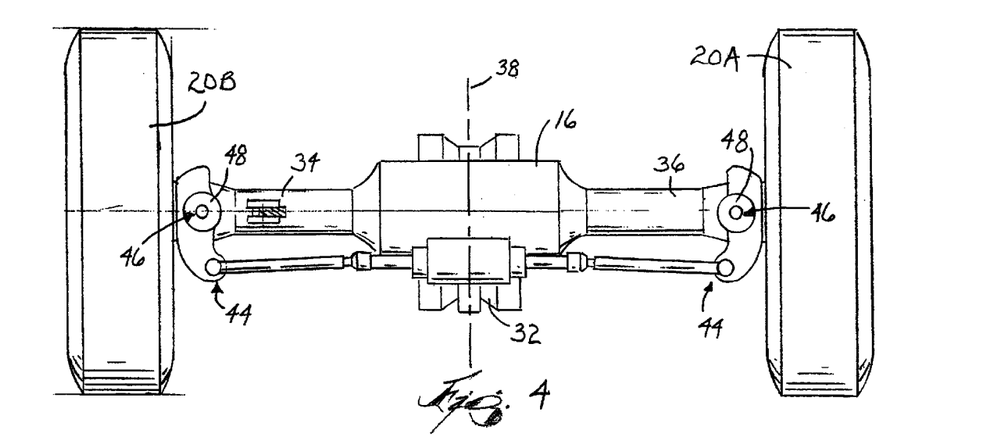
FIG. 4 is a top view illustrating a rear axle of the material handler shown in FIG. 1.
Figure 5:
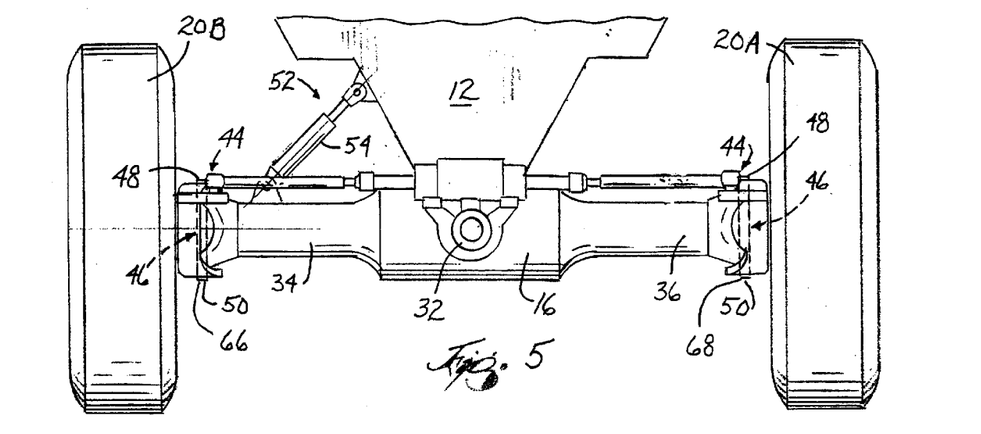
FIG. 5 is a front view illustrating the rear axle shown in FIG. 4.

FIGS. 4 and 5 illustrate the rear axle 16 of the material handler 10. The rear axle 16 is pivotally connected to the frame 12 at a pivot union 32 that divides the rear axle 16 into first and second portions 34, 36. The rear axle 16 is freely pivotable about the horizontal axis 38 or controllably fixed with an axis stabilization system 52. The axis stabilization system 52 allows the operator to prevent the rear axle 16 from pivoting in one or both directions. The axis stabilization system 52 includes a lockable shock absorber 54 that is connected between the frame 12 and the first portion 34 of the rear axle 16.

The lockable shock absorber 54 is freely extendable and retractable when the lockable shock absorber is in a free state such that the rear axle 16 is freely pivotable relative to the frame 12. The lockable shock absorber 54 is freely extendable but locked against retraction when the lockable shock absorber 54 is in a first fixed state to prevent further retraction that would otherwise place the machine's center of gravity beyond limits in the direction of retraction. The lockable shock absorber 54 is freely retractable but locked against extension when the lockable shock absorber 54 is in a second fixed state to prevent further extension that would otherwise place the machine's center of gravity beyond limits in the direction of extension. Therefore the rear axle 16 is prevented from pivoting in a counterclockwise (as seen in FIG. 5) direction when the lockable shock absorber 54 is in the first fixed state and the rear axle 16 is prevented from pivoting in a clockwise direction when the lockable shock absorber 54 is in the second fixed state. In addition, the rear axle 16 is prevented from any rotation relative to the frame 12 when lockable shock absorber 54 is in a third fixed state. The lockable shock absorber 54 generate a first fixed signal when the lockable shock absorber 54 is in the first fixed state, a second fixed signal when the lockable shock absorber 54 is in the second fixed state, and a third fixed signal when the lockable shock absorber 54 is in the third fixed state.

The first rear wheel 20A is rotatably connected to the first portion 34 of the rear axle 16 and the second rear wheel 20B is rotatably connected to the second portion 36 of the rear axle 16 such that the rear wheels 20A, 20B can be driven by the engine to move the frame 12 of the material handler 10. The portions 34, 36 of the rear axle 16 include steering assemblies 44 that allow the rear wheels 20A, 20B to pivot relative to the rear axle 16 the respective king pins 46. This configuration allows the operator to steer the rear wheels 20A, 20B in order to direct the motion of the material handler 10. The material handler configuration described above is known to those ordinarily skilled in the art.

As shown schematically in FIGS. 6–9, the material handler 10 includes a control system 58 that determines the center of gravity of the material handler and a load supported by the material handler and displays the location of the center of gravity within a virtual plane 60 that is a representation of a plane defined by the front and rear wheels 18A, 18B, 20A, 20B. The plane defined by the wheels is substantially horizontal when the material handler 10 is on substantially level ground. The control system 58 includes sensors 62, 64, 66, 68 that generate signals which correspond to the force that the material handler 10 applies to each wheel. The sensors 62, 64, 66, 68 are positioned on the lower king pins 48 adjacent to the wheels 18A, 18B, 20A, 20B, respectively. Each sensor is a strain gage that is mounted to the respective lower king pin 48 such that when a force is applied to the adjacent wheel the strain gage is capable of generating a corresponding signal from stresses transferred to the adjacent lower king pin 48.

Figure 6:
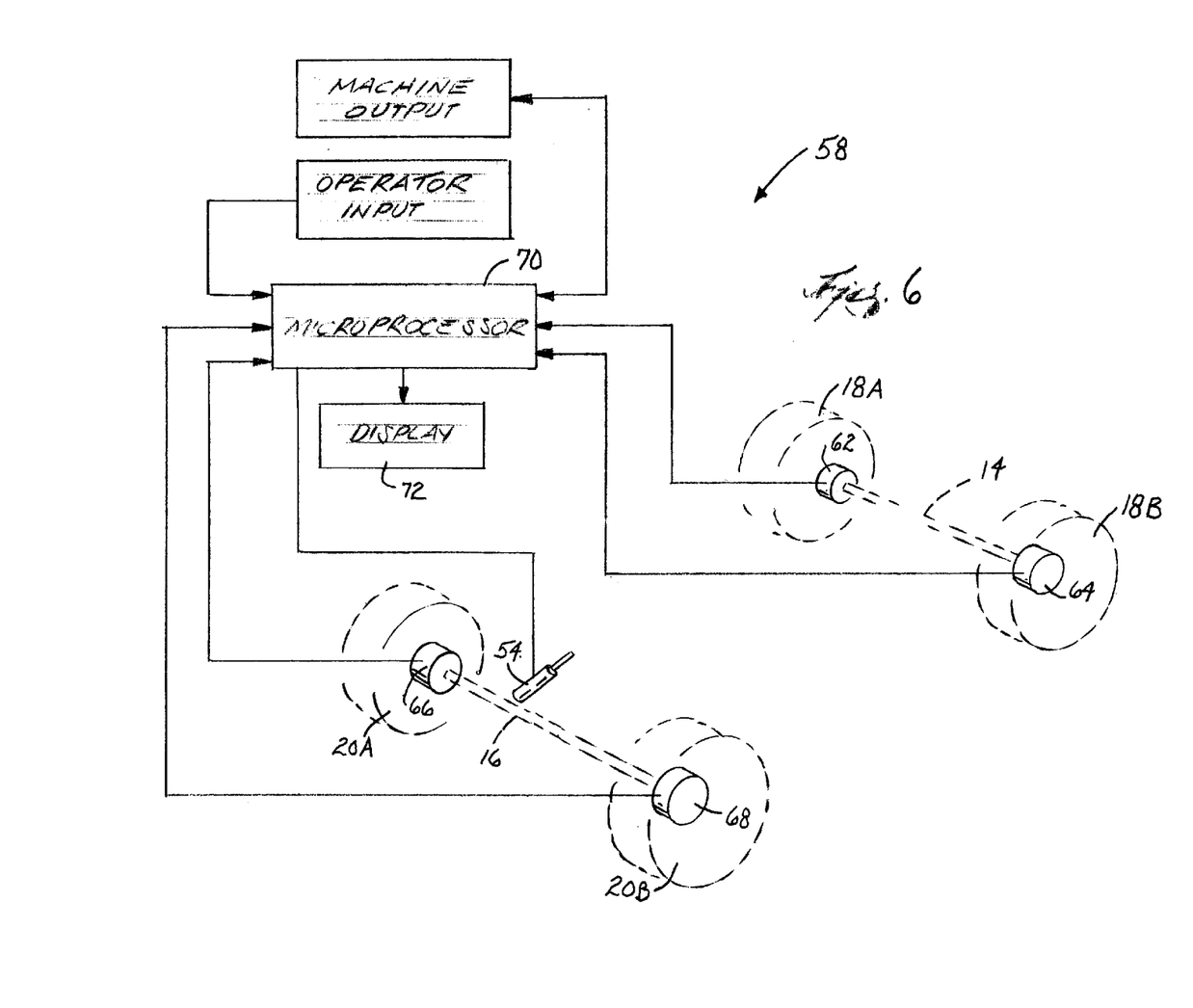
FIG. 6 is a schematic view illustrating a control system of the material handler shown in FIG. 1.

The control system 58 includes a controller 70 such as a microprocessor that receives the signals from the sensors 62, 64, 66, 68 and determines the location of the center of gravity with respect to the wheels 18A, 18B, 20A, 20B based upon the relative amount of force applied to each wheel 18A, 18B, 20A, 20B from the frame 12. For example, if the load is distributed equally between the four wheels 18A, 18B, 20A, 20B, the center of gravity would be centered between the front and rear wheels 18A, 18B, 20A, 20B and centered between the first portions 34 of the axles 14, 16 and the second portions 36 of the axles 14, 16. One such commercially available microprocessor is Part No. DS-50, which is manufactured by PAT America, Inc.

The control system 58 includes a screen 72 that is mounted in the operator's station 22 and that displays the center of gravity with a cursor 74 located on the screen 72. The cursor 74 can be any visual cue that identifies a position. The screen 72 is preferably a thin film electroluminescent display that is capable of displaying a wide range of graphics. The screen 72 also displays the cursor 74 relative to a boundary 76 that defines a productive zone 78 in which the material handler 10 is stable and a non-productive zone 80 in which the material handler 10 is unstable, which represents a loading condition in which the material handler 10 is likely to tip over. The boundaries 76 are automatically variable depending upon the state of the rear axle 16. Specifically, the boundary 76 is changed according to the signals generated by the lockable shock absorber 54 and received by the controller 70.

Figure 7:
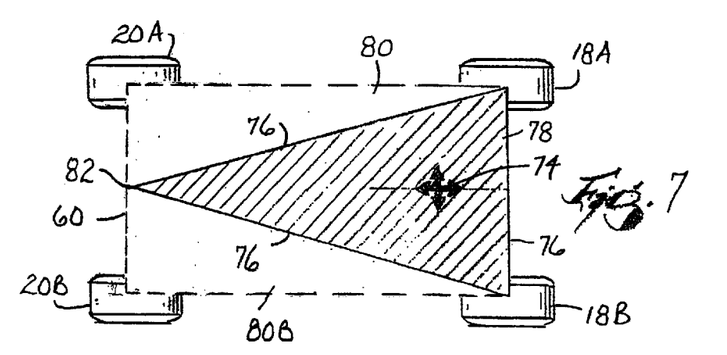
FIGS. 7–9 illustrate boundaries that are displayed on a screen of the material handler shown in FIG. 1.
Figure 8:
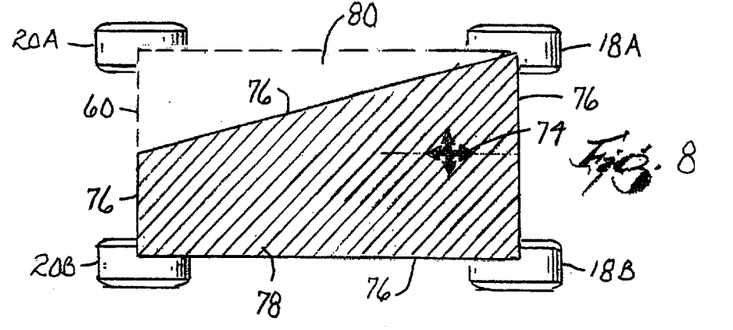
Figure 9:
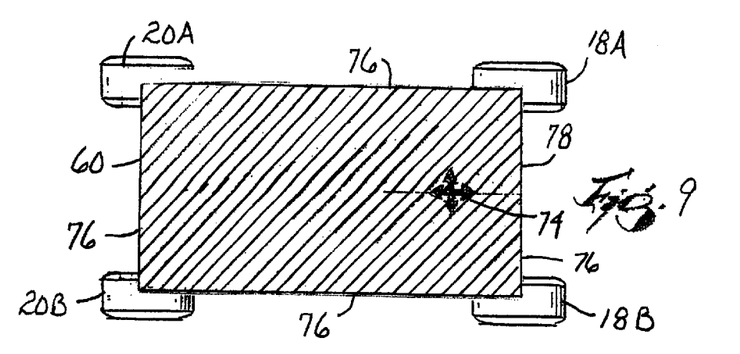

FIGS. 7–9 illustrate boundaries 76 that are displayed on the screen 72 of the control system 58. FIG. 7 illustrates the boundary 76 that is displayed when the first and second lockable shock absorber 54 is in the free state and the rear axle 16 is freely pivotable. The boundary 76 is generally triangular and represents a line that connects the front wheels 18A, 18B and lines that converge from the front wheels 18A, 18B to a point 82 located between the rear wheels 20A, 20B.

FIG. 8 illustrates the boundary 76 that is displayed when the lockable shock absorber 54 is in the first fixed state such that the rear axle 16 is allowed to rotate in a first direction (e.g., in a counterclockwise direction as shown in FIG. 5) and prevented from rotating in a second direction. The boundary 76 represents a line that extends from the first front wheel 18A to the second front wheel 18B, from the second front wheel 18B to the second rear wheel 20B, from the second rear wheel 20B to the point 82 between the first and second rear wheel 20A, 20B, and from the point 82 to the first front wheel 18A. Alternatively, if the lockable shock absorber 54 is in the second fixed state, the rear axle 16 is allowed to rotate in a second direction (e.g., in a clockwise direction as shown in FIG. 5). In this case, the boundary 76 represents a line that extends from the first front wheel 18A to the second front wheel 18B, from the second front wheel 18B to the point 82 between the first and second rear wheel 20A, 20B, from the point 82 to the first rear wheel 20A, and from the first rear wheel 20A to the first front wheel 18A.

FIG. 9 illustrates the boundary 76 that is displayed when the lockable shock absorber 54 is in the third fixed state and the rear axle 16 is non-pivotable relative to the frame 12. The boundary 76 is rectangular and is defined by the first front wheel 18A, the second front wheel 18B, the first rear wheel 20A, and the second rear wheel 20B.

The location of the center of gravity changes as the loading conditions of the material handler 10 change. Operation of the boom 24 is a major factor in determining the position of the center of gravity. The center of gravity moves relative to the plane defined by the wheel base by such actions as lifting a load with the telescoping boom 24, pivoting the boom 24, and extending the boom 24. Other factors that determine the location of the center of gravity of the material handler 10 are the slope and grade of the terrain, and acceleration forces from turning, moving, and braking the material handler 10.

The controller 70 may prevent the execution of material handler functions that would otherwise move the displayed center of gravity from the productive zone 78 into the non-productive zone 80. For example, if the cursor 74 is located near the right edge of the boundary 76 displayed in FIG. 7 and the operator attempts to extend the telescoping boom 24 which, under normal circumstances, would potentially tip the material handler 10 forward, then the controller 70 prevents the extension of the telescoping boom 24 by not sending the signal from the operator controls to the telescoping boom 24. The illustrated embodiment prevents the operations of the telescoping boom 24 if those operations would otherwise move the center of gravity into the non-productive zone 80. Other functions of the material handler 10 can be monitored in a similar manner and such monitoring is within the scope of the present invention.

We claim:

1. A material handler comprising:
   a frame;
   a telescoping boom coupled with the frame for supporting a load;
   first and second front wheels rotatably coupled to the frame;
   a front axle coupled to the frame, the first front wheel being rotatably coupled to a first portion of the front axle and the second front wheel being rotatably coupled to a second portion of the front axle;
   first and second rear wheels rotatably coupled to the frame, the front and rear wheels supporting the frame for movement over the ground and defining a plane;
   a rear axle pivotally coupled to the frame the first rear wheel being rotatably coupled to a first portion of the rear axle and the second rear wheel being rotatably coupled to a second portion of the rear axle; and
   a control system including a first sensor positioned on the front axle adjacent to the first front wheel, a second sensor positioned on the front axle adjacent to the second front wheel, a third sensor positioned on the rear axle adjacent to the first rear wheel, and a fourth sensor positioned on the rear axle adjacent to the second rear wheel, each sensor generating signals corresponding to the force that the material handler applies to the adjacent wheel, and a display device disposed generally on the frame, the control system being configured to determine from the sensor signals the center of gravity of the combination of the material handler and any load supported by the material handler and to display on the display device the location of the center of gravity within a virtual plane that is a representation of the plane defined by the wheels.

2. The material handler of claim 1, wherein the plane defined by the wheels is substantially horizontal when the material handler is on substantially level ground.

3. The material handler of claim 1, wherein the control system includes a screen and displays the center of gravity with a cursor located on the screen.

4. The material handler of claim 1, wherein the front and rear axles include king pins located at the first portion of the front axle, the second portion of the front axle, the first portion of the rear axle, and the second portion of the rear axle, and wherein the sensors are located on the king pins.

5. The material handler of claim 4, wherein the sensors are strain gauges.

6. The material handler of claim 1, wherein the control system also displays the location of the center of gravity relative to a boundary, the boundary defining a productive zone in which the material handler is stable and an non-productive zone in which the material handler is unstable.

7. The material handler of claim 6, wherein the front axle is non-pivotable relative to the frame and the rear axle is freely pivotable relative to the frame and wherein the boundary is generally triangular and represents a line that connects the front wheels and lines that converge from the front wheels to a point located between the rear wheels.

8. The material handler of claim 6, wherein the control system prevents the execution of material handler functions that would otherwise move the displayed center of gravity from the productive zone into the non-productive zone.

9. The material handler of claim 8, wherein the control system allows material handler functions that move the displayed center of gravity anywhere within the productive zone.

10. The material handler of claim 9, wherein the telescoping boom is movable between a retracted position and an extended position, and pivotable between a lowered position and a raised position, wherein the material handler functions include extending and pivoting the boom.

* * * * *

UNITED STATES PATENT AND TRADEMARK OFFICE
CERTIFICATE OF CORRECTION

PATENT NO. : 6,985,795 B2  Page 1 of 1
APPLICATION NO. : 09/961063
DATED : January 10, 2006
INVENTOR(S) : Michael J. Scotese

It is certified that error appears in the above-identified patent and that said Letters Patent is hereby corrected as shown below:

On the title page:
Replace    (73)  Assignee: Schlage Lock Company, Indianapolis, IN (US)

with       (73)  Assignee: Ingersoll-Rand Company, Woodcliff Lake, NJ (US)

Signed and Sealed this

Nineteenth Day of May, 2009

JOHN DOLL
*Acting Director of the United States Patent and Trademark Office*